United States Patent [19]
Blumenthal
[11] Patent Number: 4,520,985
[45] Date of Patent: Jun. 4, 1985

[54] PLAYING FIELD BOUNDARY FLAG AND SUPPORT THEREFOR

[75] Inventor: Lawrence S. Blumenthal, Kansas City, Mo.
[73] Assignee: Gelhaar Uniform Company, Kansas City, Mo.

[21] Appl. No.: 421,410
[22] Filed: Sep. 22, 1982
[51] Int. Cl.[3] F16M 13/00
[52] U.S. Cl. 248/530; 248/156
[58] Field of Search 248/530, 532, 534, 156, 248/85, 87, 545, 188.5; 211/29

[56] References Cited

U.S. PATENT DOCUMENTS

| | | | |
|---|---|---|---|
| 2,956,762 | 10/1960 | Alston | 248/87 |
| 3,182,936 | 5/1965 | Murdock | 248/530 |
| 3,199,818 | 8/1965 | Ahara | 248/188.5 |
| 3,283,733 | 11/1966 | Boerma | 248/156 |
| 3,831,891 | 8/1974 | Jester | 248/545 |
| 4,089,423 | 5/1978 | Gorham et al. | 248/156 |
| 4,098,041 | 7/1978 | Frye | 248/156 |

*Primary Examiner*—William H. Schultz
*Assistant Examiner*—Ramon O. Ramirez
*Attorney, Agent, or Firm*—Kokjer, Kircher, Bradley, Wharton, Bowman & Johnson

[57] ABSTRACT

A flag staff having a hollow end coupled with a ground embeddable support means. The support means is in the form of a ground penetrating blade having a shaft above ground which couples with the hollow end of the staff. A foot engagable rod is secured and extends laterally from the support means so that foot pressure can be used to force the blade into the ground. The rod also serves to limit depth of penetration.

4 Claims, 3 Drawing Figures

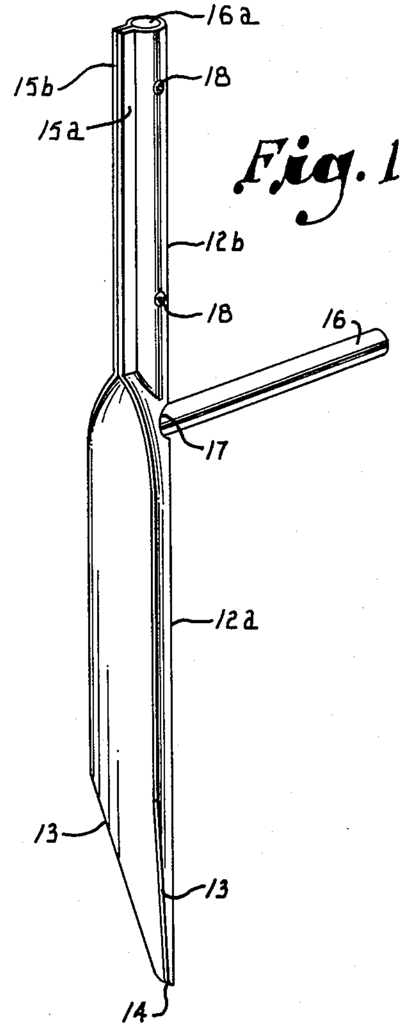
Fig. 1.
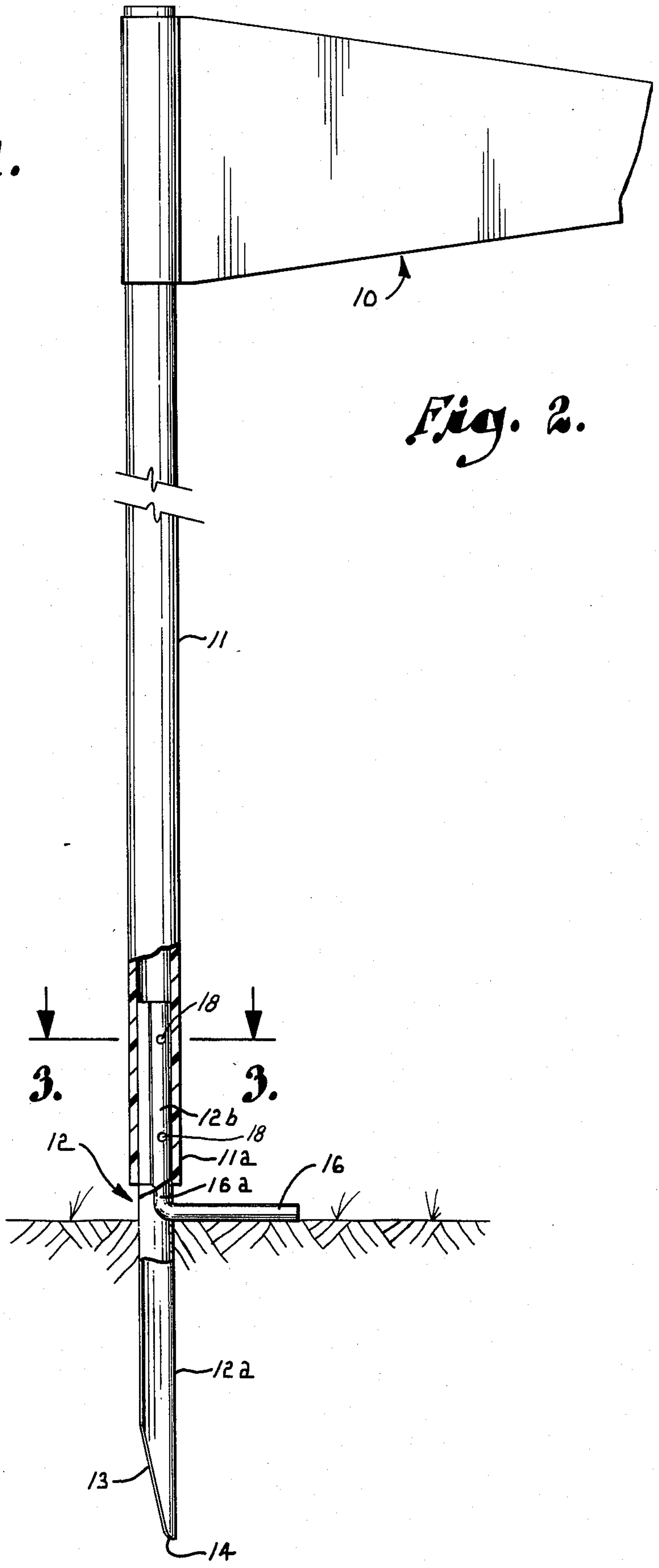
Fig. 2.
Fig. 3.
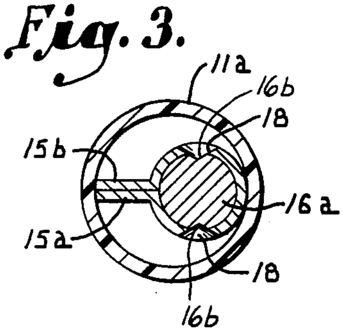

PLAYING FIELD BOUNDARY FLAG AND SUPPORT THEREFOR

BACKGROUND AND SUMMARY OF THE INVENTION

This invention relates generally to boundary markers for playing fields for sports and deals more particularly with a soccer boundary flag and the means for supporting it.

It is necessary to mark the corners of soccer fields with boundary marker flags. While permanent fields can have permanent markers, the bulk of soccer today, at least in the United States, is played on multiple purpose fields or on fields that are created temporarily in parks and on other grassy areas. The marking up of such fields requires provision of boundary flags which can readily be positioned in place on a temporary use basis and which can then be removed and stored or transported to a new location.

The principal object of the present invention is to provide such a flag and support means therefor.

Among the many advantages of the flag and support means therefor of the present invention are: that it is light in weight and low in cost; that the support means is of simple construction requiring no welding or expensive machine work; that the support means is constructed so as to permit easy penetration into the ground to provide an anchor for the flag staff; that the coupling of the flag staff with the support is very easily accomplished; that the support means includes depth means limiting the extent of maximum penetration into the grounds; and that the support means can be constructed at low cost and yet will withstand years of rugged use without damage.

In summary, my invention provides a flag having a flexible staff, the anchored end of which has a hollow recess which fits over a shaft on a support means. The shaft is formed by curling a portion of a metal sheet into a tube. Another portion of the same shaft is trimmed and configured as a spade-like blade section for penetrating the ground and anchoring the shaft to the ground but above ground level. A rod extends laterally from the side of the support means at the juncture of blade and shaft, the rod extending through an opening in the sheet metal and having a right angle continuation confined within the hollow shaft. The laterally extending rod provides a place for exerting foot pressure in a direction to force the blade into the ground. It also limits the maximum depth of penetration.

DETAILED DESCRIPTION OF THE INVENTION

In the accompanying drawing, which forms a part of the specification and is to be read in conjunction therewith, and in which like reference numerals indicate like parts in the various views;

FIG. 1 is a perspective view of the flag support means;

FIG. 2 is an elevational view of the flag showing the support means in position in the ground, parts being broken away to indicate interrupted length and other parts being broken away and shown in section for purpose of illustration; and FIG 3 is a sectional view on an enlarged scale taken along line 3—3 of FIG. 2 in the direction of the arrows.

Referring now to the drawing, and initially to FIG. 2, the soccer flag is attached to the upper end of a staff 11.

The staff 11 is preferably constructed of a flexible but relatively stiff plastic-like material which permits bending on impact but which normally maintains the flag in an upright position. Preferably the shaft is a hollow tube having the lower hollow portion 11*a* which is fitted over the support means now to be described.

The support means, which is seen in perspective in FIG. 1, and penetrating the ground in FIG. 2, has the lower blade-like portion 12*a* and the upper shaft portion 12*b* over which the lower end of the flag staff is fitted.

The blade and shaft are formed from a single piece of material, preferably from a sheet of metal such as steel. The blade portion 12*a* is provided at the lower end with the beveled edges 13 which converge to form a tip 14 for initial penetration of the ground. The blade has a V-shaped cross section to give it longitudinal structural stability so as to resist deformation during forcing of it into the ground.

The shaft portion 12*b* is formed as a hollow tube by curling the metal sheet into the circular form illustrated. The edges of the curled portions are formed as flanges 15*a* and 15*b* which abut one another at a seam and run lengthwise of the shaft.

A foot rod 16 extends laterally from the support means near the juncture of the blade 12*a* and shaft 12*b*. The extending rod portion 16 is formed as an integral part with an angularly bent rod section 16*a* which extends upwardly through and is confined within the hollow interior of the shaft 12*b*. The rod 16 extends outwardly through an opening 17 formed near the juncture of the blade 12*a* and shaft 12*b*.

The shaft 12*b* and rod section 16*a* are locked together against twisting movement by the tapped detents 18 which match with corresponding recesses 16*b* formed in the exterior of the rod 16*a*, thus stabilizing the extending foot rod 16 in its radial position.

In use the support means is normally coupled with the lower end of the flag staff prior to engaging the support means with the earth. To engage the support means with the earth, one simply needs to position the tip 14 of the blade on the ground with the support means in an upright position, place the foot upon rod 16 and force the blade downwardly into the ground.

Penetration will continue until the underside of the rod strikes the top surface of the ground. The support means now serve to support the flag staff in the upright position.

The unit can be easily removed from the ground simply by grasping the flag staff near the bottom and pulling upwardly. If additional force is needed it can be obtained by prying with an appropriate instrument under the rod 16.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A ground insertable support for a playing field boundary marking flag mounted on a flexible staff having a hollow mounting end, said support comprising a ground engaging member having a blade portion tipped at one end for insertion in the ground and having a hollow shaft portion extending from the other end of the blade portion in general alignment with the lengthwise direction of the blade portion and adapted to be fitted inside said hollow mounting end of the flexible flag staff, a rod having a first portion- confined in said hollow shaft, said rod including a second portion bent laterally away from the axis of the first portion and extending through an opening in said ground engaging member located near the juncture of said blade portion and said shaft portion, said second portion of said rod providing surfaces respectively for application of pressure to drive the blade portion into the ground and for limiting the maximum depth of penetration to keep the shaft portion above ground level.

2. A support as in claim 1, said ground engaging member formed from a single piece of sheet metal, the blade portion having a generally V-shaped cross section, said hollow shaft portion being formed by curling the metal into tube form with a seam along the side.

3. A support as in claim 2, said seam including abutting flanges extending laterally from an lengthwise of the curled sections.

4. A support as in claim 1, the interior of said hollow shaft and exterior of said first rod portion including registering detense and recesses for resisting twisting movement of one relative to the other.

* * * * *